United States Patent
Fairhurst et al.

(10) Patent No.: US 7,221,407 B2
(45) Date of Patent: May 22, 2007

(54) TELEVISION HAVING A JAVA ENGINE AND A REMOVABLE DEVICE PORT

(75) Inventors: Jon Arthur Fairhurst, Camas, WA (US); Henry Y. Fang, Cerritos, CA (US); Bryan Severt Hallberg, Vancouver, WA (US); Mark Gregory Hanley, Skamania, WA (US); Vishnu Kumar Shivaj Rao, Vancouver, WA (US); Jeffrey B. Sampsell, San Francisco, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 549 days.

(21) Appl. No.: 10/868,591

(22) Filed: Jun. 14, 2004

(65) Prior Publication Data

US 2005/0166253 A1   Jul. 28, 2005

Related U.S. Application Data

(60) Provisional application No. 60/535,149, filed on Jan. 6, 2004.

(51) Int. Cl.
*H04N 7/00* (2006.01)
*H04N 11/00* (2006.01)

(52) U.S. Cl. .................................. 348/552; 348/589
(58) Field of Classification Search ............... 348/552, 348/553, 554, 555, 563, 564, 734, 725, 584, 348/586, 589, 596
See application file for complete search history.

(56) References Cited

U.S. PATENT DOCUMENTS

| 6,163,316 | A  | * | 12/2000 | Killian | ...................... | 715/721 |
| 6,346,933 | B1 | * | 2/2002  | Lin     | ............................ | 345/157 |
| 6,510,557 | B1 | * | 1/2003  | Thrift  | ........................ | 725/110 |
| 6,762,798 | B1 | * | 7/2004  | Messer et al. | .............. | 348/565 |

* cited by examiner

*Primary Examiner*—Michael H. Lee
(74) *Attorney, Agent, or Firm*—Marger Johnson & McCollom PC (57) ABSTRACT

Method and apparatus for use with televisions having an internal Java engine are included among the embodiments. In exemplary systems, a PCMCIA port allows the Java engine to load and execute Java applets selected by the viewer. Provision is made for system-aware applets to run concurrently with platform-independent applets on different Java display planes that are merged for display. Other embodiments are described and claimed.

24 Claims, 10 Drawing Sheets

TELEVISION HAVING A JAVA ENGINE AND A REMOVABLE DEVICE PORT

This application claims priority from U.S. provisional patent application Ser. No. 60/535,149 filed Jan. 6, 2004, titled Television Having a Java Engine and a Removable Device Port, which we incorporate in its entirety.

FIELD OF THE INVENTION

This invention pertains generally to televisions, and more particularly to televisions with the capability to run Java applications and applets or similar routines.

BACKGROUND

Television receivers have long had the capability to create simple "On Screen Display" (OSD) graphics that overlay a received video program. Such graphics can display video and audio settings for interactive television adjustments, closed captioning, current channel/input selections, etc. A simple graphics generator or television processor provides the graphics in such systems.

Recently, television receivers such as the Sharp Aquos™ have been introduced with more sophisticated graphics capability that allows a richer menu experience. These graphics are programmed as a fixed routine that is run by a television processor when the user selects a menu function with a remote. The fixed routine is stored in a ROM at the time of manufacture and called as needed based on viewer input, e.g., with a remote control.

Some computers have the capability to run Java applets in one application window and display digital video (e.g. from a DVD-ROM inserted in an attached drive or Internet-streamed video) in another application window. Such a computer is not a "television" but a multi-tasking computer platform that can run video display software as merely another graphical application controlled by the operating system. Current televisions do not have a capability for a viewer to select and run different Java applets, and more specifically, have no provision that would allow a viewer to load and run applets on the television that were not part of the television at the time of manufacture.

BRIEF DESCRIPTION OF THE DRAWING

The embodiments may be best understood by reading the disclosure with reference to the drawing, wherein.

DETAILED DESCRIPTION OF THE EMBODIMENTS

This description pertains to televisions with the capability to run Java (or similar) applets and display output from the Java applets to the television display. Standard Java does not support multi-plane graphics, which can be highly desirable in a television where multiple concurrently executing applets may be necessary and/or the system itself may need to create Java output.

As used herein, a television primarily functions to display video from one or more external video sources. The television embodiments described herein still retain this primary function, but have added capabilities to run applets that can create graphical output that overlays (or supercedes) a video source. As televisions generally do not possess the voluminous processing and storage resources of a computer, are expected to fit in a clean form factor similar in size to the display itself, and preferably are operable by persons with less technical expertise than computer users, using simpler interface devices, running applets on a television presents particular challenges that are addressed herein. In particular, newer LCD and plasma televisions tout their thinness and lightness as selling points, and thus have little room for the bulky heat-generating components of a fast computer.

Conventional televisions offer a fixed set of pre-loaded graphical applications, typically limited to configuration menus for the television. The embodiments below can include a richer set of pre-loaded applets/applications, for instance voice messaging, timers, media players/recorders/time shifters and media locator/selectors, etc. The embodiments also offer a viewer the capability to select other applets—not preloaded on the television—and run the applets on the television. In addition to new or upgraded applets developed specifically for the television platform ("platform-aware" applets), the embodiments preferably also allow a viewer to run applets that are platform independent, such as games or other applets that are typically available to computer users. Because platform-independent applets are currently developed without use by a television viewer as a primary consideration, the television embodiments herein preferably allow such applets to run as expected, while still allowing the television to function as expected.

To allow a viewer to provide new applets to the television, the television contains a removable device port, which supports media, as well as other removable devices. In some embodiments, the removable device port comprises one or two PCMCIA (Personal Computer Memory Card International Association) PC card ports. The PC card and its ports are described in a series of standards dating back to the 1980s—see, for instance, *PC Card Standard 8.0 Release—April* 2001. The PC card interface was developed for laptop computers and other computers that do not provide the large internal card bays (e.g., for Peripheral Component Interconnect cards) of desktop and tower servers. PC cards manufactured today provide Ethernet network interfaces, modems, wireless network interfaces (e.g., IEEE 802.11x), mass storage with micro disk drives or flash memory (CompactFlash), and CompactFlash adapters for other flash formats such as Memory Stick, MultiMedia Card, Secure Digital, SmartMedia, and XD. In some embodiments, applets can be provided to the television by loading the applets to a mass storage device, e.g., from a computer, or purchasing a mass storage device with the applets preloaded, and then connecting the mass storage device to the PC card port. Alternately, with a wireless network interface card inserted in the PCMCIA port, applets stored on a personal computer on the same wireless network can be accessed at the television. Additionally, the television may accept and support other PCMCIA-compatible devices.

Figure 1:
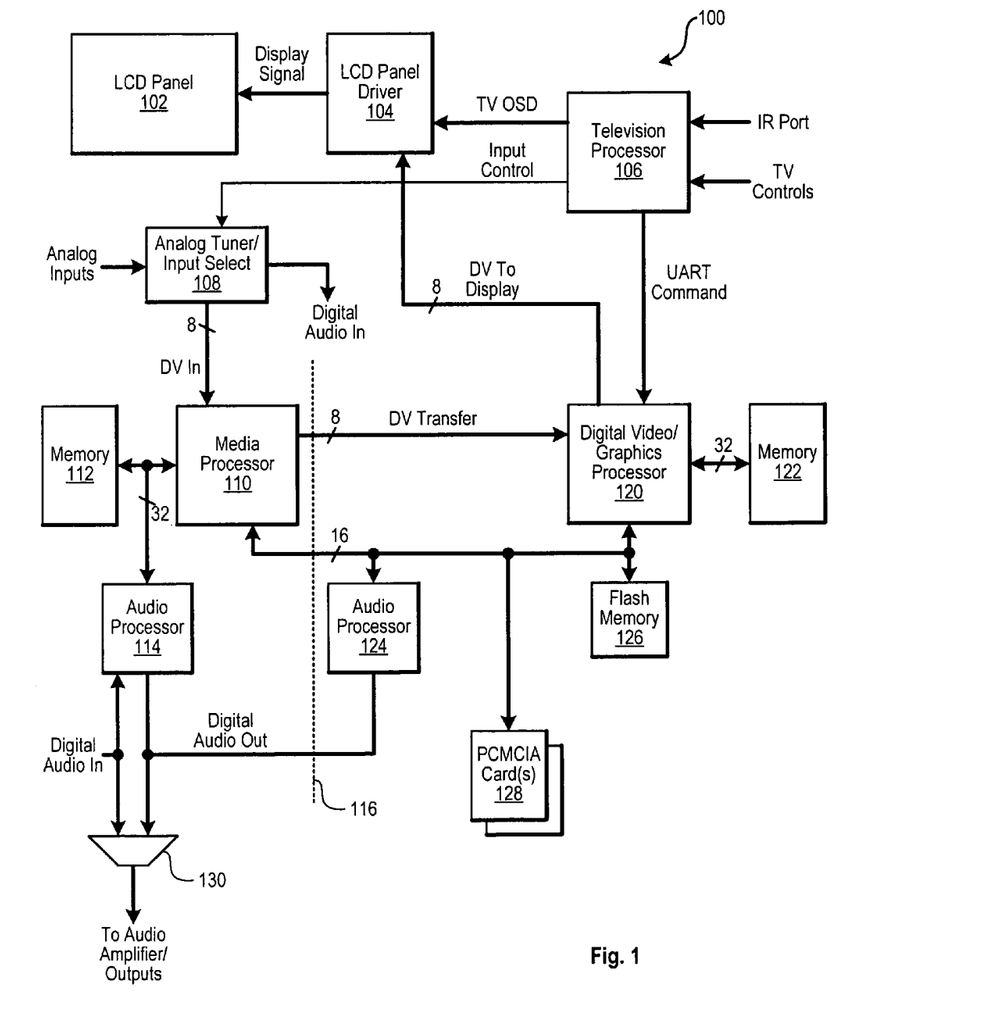
FIG. 1 contains a block diagram for a digital television according to some embodiments of the present invention.

FIG. 1 contains a block diagram for a Liquid Crystal Display (LCD) television capable of operating according to some embodiments of the present invention. Television 100 contains an LCD panel 102 to display visual output to a viewer based on a display signal generated by an LCD panel driver 104. LCD panel driver 104 accepts a primary digital video signal in CCIR656 format (eight bits per pixel $YC_bC_r$, in a "4:2:2" data ratio wherein two $C_b$ and two $C_r$ pixels are supplied for every four luminance pixels) from a digital video/graphics processor 120.

A television processor 106 provides basic control functions and viewer input interfaces for television 100. Television processor 106 receives viewer commands, both from buttons located on the television itself (TV controls) and from a handheld remote control unit (not shown) through the IR Port. Based on the viewer commands, television processor 106 controls an analog tuner/input select section 108, and also supplies user inputs to the digital video/graphics processor 120 over a Universal Asynchronous Receiver/Transmitter (UART) command channel. Television processor 106 is also capable of generating basic On-Screen Display (OSD) graphics, e.g., indicating which input is selected, the current audio volume setting, etc. Television processor 106 supplies these OSD graphics, when activated, as a TV OSD signal to LCD panel driver 104 for overlay on the display signal.

Analog tuner/input select section 108 allows television 100 to switch between various analog (or possibly digital) inputs for both video and audio. Video inputs can include a radio frequency (RF) signal carrying standard broadcast television, digital television, and/or high-definition television signals, NTSC video, S-Video, and/or RGB component video inputs, although various embodiments may not accept each of these signal types or may accept signals in other formats (such as PAL). The selected video input is converted to a digital data stream, DV In, in CCIR656 format and supplied to a media processor 110.

Analog tuner/input select section 108 also selects an audio source, digitizes that source if necessary, and supplies that digitized source as Digital Audio In to an audio processor 114 and a multiplexer 130. The audio source can be selected—independent of the current video source—as the audio channel(s) of a currently tuned RF television signal, stereophonic or monophonic audio connected to television 100 by audio jacks corresponding to a video input, or an internal microphone.

Media processor 110 and digital video/graphics processor 120 provide various digital feature capabilities for television 100, as will be explained further in the specific embodiments below. In some embodiments, processors 110 and 120 can be TMS320DM270 signal processors, available from Texas Instruments, Inc., Dallas, Tex. Digital video/graphics processor 120 functions as a master processor, and media processor 110 functions as a slave processor. Media processor 110 supplies digital video, either corresponding to DV In or to a decoded media stream from another source, to digital video/graphics processor 120 over a DV transfer bus.

Media processor 110 performs MPEG (Motion Picture Expert Group) coding and decoding of digital media streams for television 100, as instructed by digital video/graphics processor 120. A 32-bit-wide data bus connects memory 112, e.g., two 16-bit-wide×1M synchronous DRAM devices connected in parallel, to processor 110. An audio processor 114 also connects to this data bus to provide audio coding and decoding for media streams handled by media processor 110.

Dotted line 116 divides the media processor subsystem from the host processor subsystem. Media processor 110 cannot directly access the devices on the right (host) side of dotted line 116. Digital video/graphics processor 120 can access media processor 110 and memory 112 directly, however, and thus indirectly provides connectivity between media processor 110 and flash memory 126 or PCMCIA cards 128.

Digital video/graphics processor 120 coordinates (and/or implements) many of the digital features of television 100. A 32-bit-wide data bus connects memory 122, e.g., two 16-bit-wide×1M synchronous DRAM devices connected in parallel, to processor 120. A 16-bit-wide system bus connects processor 120 to media processor 110, an audio processor 124, flash memory 126, and ports for removable PCMCIA cards 128. Flash memory 126 stores boot code, configuration data, system executable code, and Java code/class files for graphics applications and applets, etc. PCMCIA cards 128 can provide extended media and/or application capability, such as the Java applets explained herein.

Digital video/graphics processor 120 can pass data from the DV Transfer bus to LCD panel driver 104 as is, but processor 120 can also supercede, modify, or superimpose the DV Transfer signal with other content. For instance, processor 120 can generate Java application/applet graphics that overlay or supercede the DV Transfer signal, system graphics that display messages over all underlying content, or decode media from PCMCIA cards 128, e.g., in a "time-shifting" mode where media processor 110 is coding a program to the PCMCIA card and processor 120 decodes and displays a time-shifted version of the same program, allowing the viewer to pause, rewind, or skip through the program.

Multiplexer 130 provides audio output to the television amplifier and line outputs (not shown) from one of three sources. The first source is the current Digital Audio In stream from analog tuner/input select section 108. The second and third sources are the Digital Audio Outputs of audio processors 114 and 124. These two outputs are tied to the same input of multiplexer 130, since each audio processor is capable of tri-stating its output when it is not selected. In some embodiments, processors 114 and 124 can be TMS320VC5416 signal processors, available from Texas Instruments, Inc., Dallas, Tex.

At system powerup, digital video/graphics processor 120 creates an executable image for itself in memory 122 and for media processor 110 in memory 112. Flash memory 126 stores the elements of this image as default system code for processors 110, 114, 120, and 124. This code includes: a system manager, a Java engine, which may contain any combination of a just-in-time Java compiler, a Java interpreter, or precompiled Java code, and a Java manager that manages Java applets for processor 120; audio codecs for processors 114 and 124; and video codecs for processors 110 and 120. The system manager provides low-level functions for communication with the other devices attached to processor 120, and communicates system events to the Java manager and other processes. The Java engine interprets and executes Java code for the Java manager, and Java applets when applets are loaded.

Figure 2:
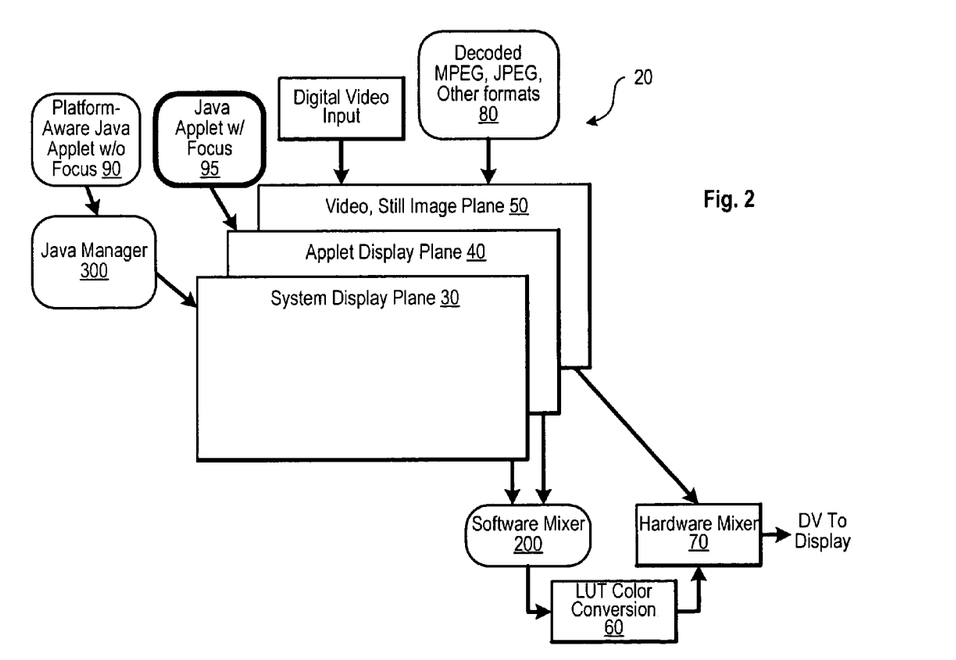
FIG. 2 shows the basic associations between display sources, display planes, and display plane mixing order according to some embodiments of the present invention.

Referring to FIG. 2, processor 120 works at various times with up to three display planes: a system display plane 30, an applet display plane 40, and a video and still image plane 50. The rearmost plane 50 can contain digital video received at the DV Transfer port from processor 110 or decoded MPEG video or JPEG images, as well as images originally stored in other formats. The middle plane 40 is active when a Java applet 95 has focus, or when the Java Manager displays graphics on the middle plane. The front plane 30 is used, typically infrequently, to display alert and status messages from the Java manager. These messages can include message requests from a platform-aware Java applet 90 that does not have focus.

To create the digital video stream for the display, software mixer 200 and hardware mixer 70 combine information from display planes 30, 40, and 50. Software mixer 200 combines information from display planes 30 and 40, as will be explained in further detail below. A look-up table (LUT) is used in block 60 to convert the output of software mixer 200 to the $YC_bC_r$ color space of video plane 50. The output of LUT color conversion block 60 is combined with video plane 50 in hardware mixer 70.

Figure 3:
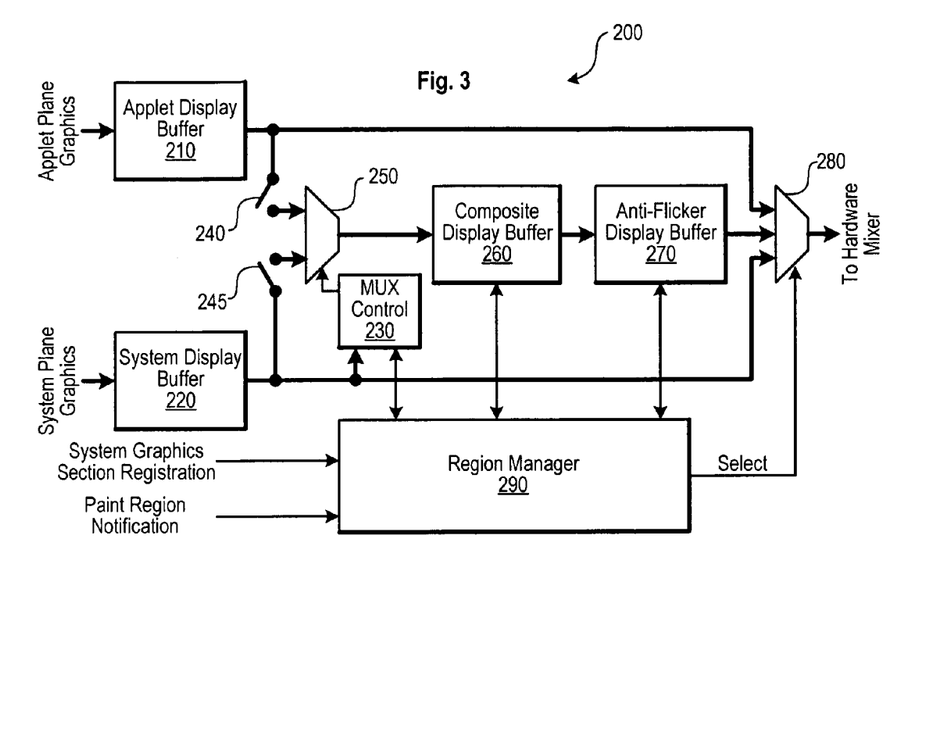
FIG. 3 illustrates in block diagram form a mechanism for multiplexing/merging two graphics planes to a common television display, useful in some embodiments of the present invention.

FIG. 3 shows internal detail of software mixer 200. Applet plane graphics are rendered to applet display buffer 210. System plane graphics are rendered to system display buffer 220. Although it is possible to merge graphics from these two planes in a fairly mindless fashion for each video frame, display artifacts would be visible to a viewer from time to time, and a significant percentage of available processing resources would be consumed merely to perform the merge. Mixer 200, however, takes advantage of the observations that system graphics are displayed a small percentage of the time and usually occupy a small region of the viewable area to provide visually acceptable mixing while consuming far less resources.

The output of software mixer 200 is taken at a multiplexer 280. Multiplexer 280 can take input from one of three buffers: applet display buffer 210, system display buffer 220, or an anti-flicker display buffer 270. The multiplexer select signal is generated by region manager 290, and the select criteria will be explained below. To summarize, however, if only one of the applet and system display planes is active, mixing is bypassed to save resources, and two switches 240 and 245 remain open. Only when both display planes are active are switches 240 and 245 closed to cause mixing to occur.

Further, even when both display planes 210 and 220 are active, mixing is only performed as needed. Region manager 290 tracks which regions of buffers 210 and 220 are being updated, and controls a MUX control block 230, a multiplexer 250, and the addressing of a composite display buffer 260 and the anti-flicker display buffer 270 to mix only the updated regions.

Figure 4:
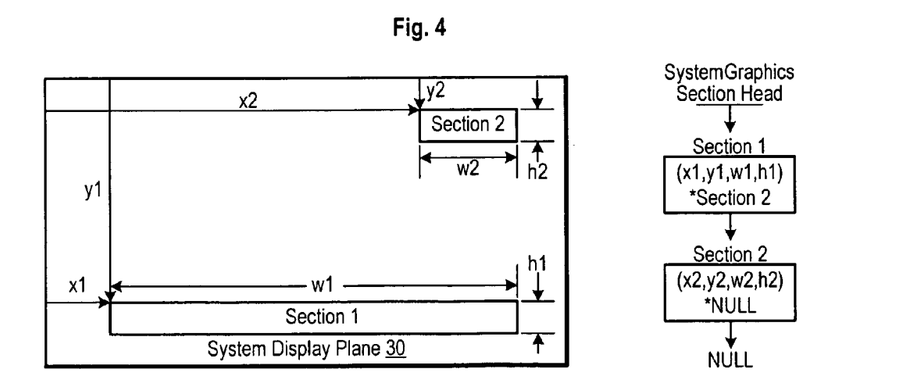
FIG. 4 shows how active regions of a system display plane are noted in a linked list in some embodiments of the present invention.

In order to intelligently control mixing, region manager 290 receives two types of notifications: system graphics section registration (and unregistration) notifications from the Java manager; and paint region notifications for both display buffers from the Java engine. The region manager 290 can be implemented, wholly or partly, within the Java engine. Referring to FIG. 4, when the Java manager 300 desires to paint system graphics to a region of the display, it calls a Java engine API (Application Programming Interface) to register a rectangular section of the display bounding the desired region (the system graphics need not be rectangular, but the registered section is preferably rectangular for simplicity). For instance, FIG. 4 shows two registered section of the system display plane. Section 1 is described by the parameters (x1, y1, w1, h1), which respectively specify the section's left boundary with respect to the left edge of the display, the section's upper boundary with respect to the top edge of the display, the section's width, and the section's height. Section 2 is described by similar parameters (x2, y2, w2, h2). A second API allows the Java manager to unregister a previously registered section.

In some embodiments, region manager 290 maintains a linked list of registered system graphics areas, with the head of the list maintained by a pointer SystemGraphics Section Head that is initially a NULL pointer. When the Java manager requests registration of section 1, a node is added to the linked list containing the parameters (x1, y1, w1, h1) and a Next pointer that is initially NULL. When the Java manager subsequently requests registration of section 2, a second node is added to the linked list containing the parameters (x2, y2, w2, h2) and a Next pointer that is initially NULL. The Next pointer of the first node is modified to point to the second node to create the linked list shown in FIG. 4.

When the Java manager unregisters a region, the corresponding node is removed from the linked list. Whenever SystemGraphics Section Head is not NULL, region manager 290 assumes that system graphics are active. Note that region manager 290 can in some embodiments choose to merge two linked list nodes to a single bounding rectangle node, particularly if the regions overlap.

Figure 6:
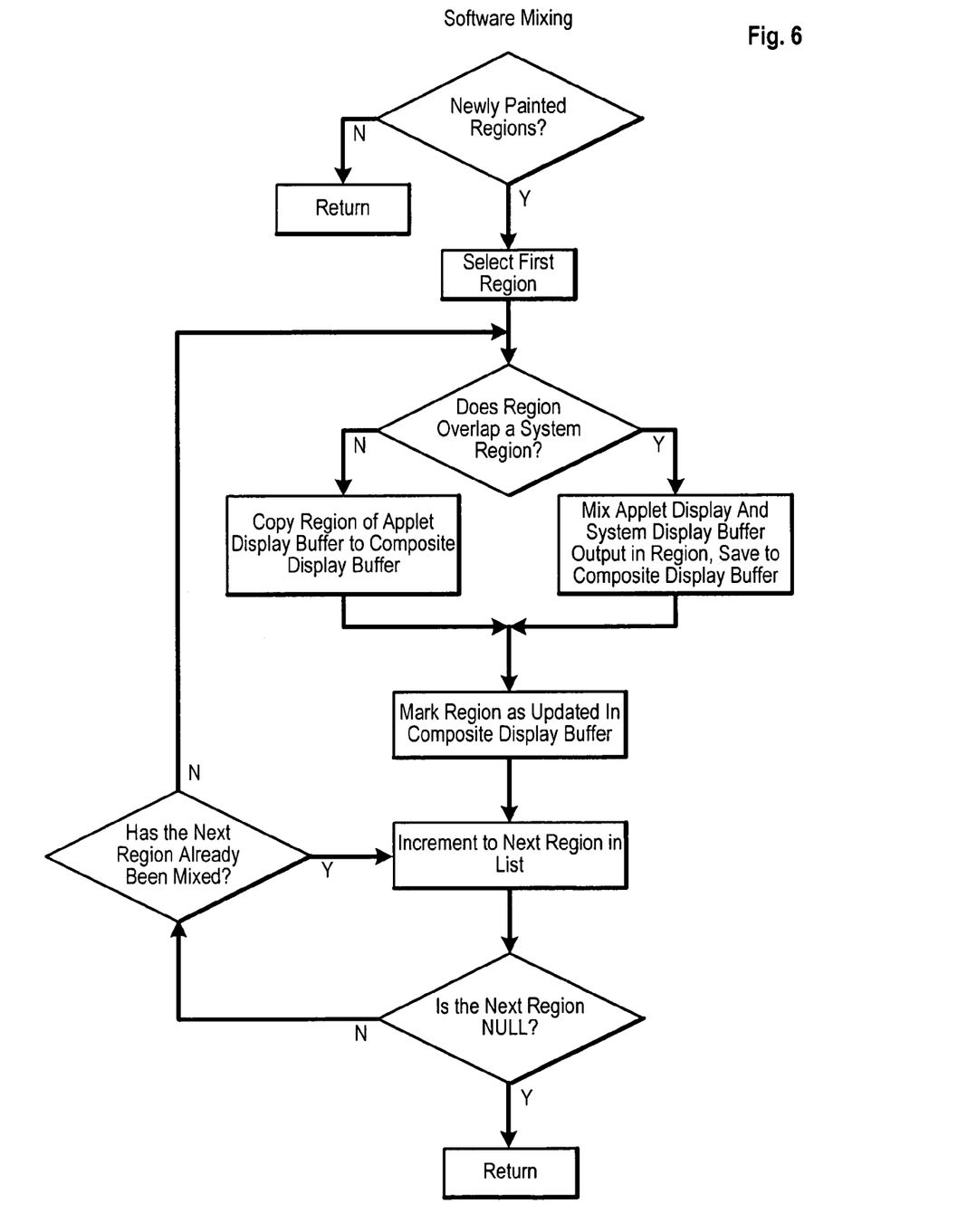
FIG. 6 contains a flowchart for low-level mixing of two Java display planes into a composite display according to some embodiments of the present invention.
Figure 7:
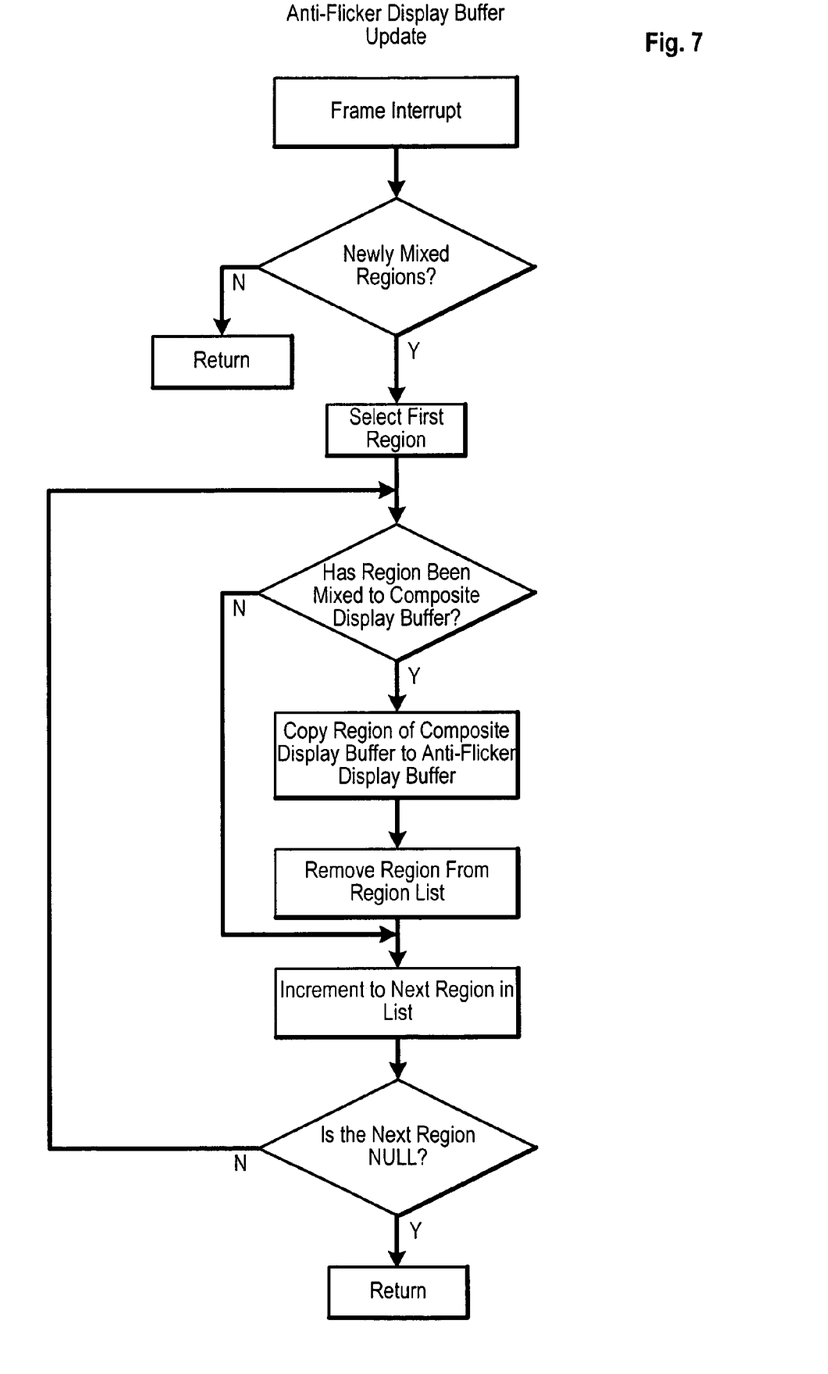
FIG. 7 contains a flowchart for low-level updates of an anti-flicker display buffer according to some embodiments of the present invention.

The second type of notification received by region manager 290 is a paint region notification. Whenever an applet with focus or a component of the Java manager calls a routine to draw to applet display buffer 210, the draw or paint routine notifies region manager 290 that a rectangular bounding region for the routine has been modified. Whenever the Java manager draws to system display buffer 220, the draw or paint routine sends a similar notification to region manager 290. Region manager 290 uses paint region notifications to create a second linked list similar to the system graphics section linked list. As shown in the flowcharts of FIGS. 5–7, region manager 290 uses the paint region linked list to control mixing when both buffers 210 and 220 are active.

Returning briefly to FIG. 3, MUX control 230 controls the mixing operation of multiplexer 250. MUX control 230 causes multiplexer 250 to operate on the portions of buffers 210 and 220 that are newly added to the paint region linked list. If a newly-painted section does not overlap a current system graphics section, switch 245 is kept open and the paint region is copied to the composite display buffer. When a system graphics section is overlapped, mixing is required. In that case, MUX control 230 looks for a hard key in the pixel data coming out of system display buffer 220: when the hard key is not set for a particular pixel, the current pixel in buffer 220 is copied to composite display buffer 260; when the hard key is set for a particular pixel, the current pixel in buffer 210 is copied to composite display buffer 260. In some implementations, the hard key is a pixel value of zero, which indicates a transparent pixel.

Figure 5:
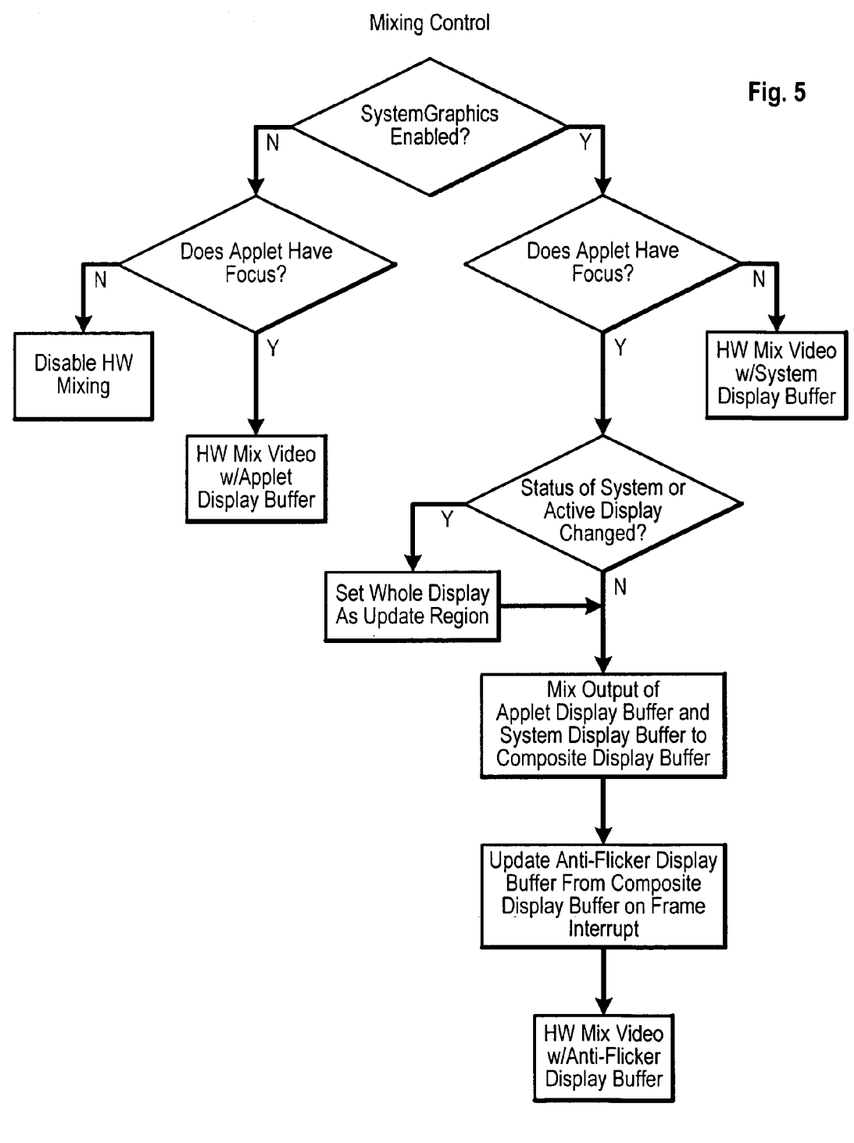
FIG. 5 contains a flowchart indicating high-level control for software mixing of two Java display planes according to some embodiments of the present invention.

FIG. 5 shows the high-level mixing control operation of region manager 290. The output of mixer 280 depends on whether system graphics are enabled and whether an applet (or the Java manager) has focus. When both of these conditions are false, region manager 290 disables hardware mixing and multiplexer 280 need not produce any output.

When system graphics are disabled but an applet has focus, the applet display buffer 210 output is selected for hardware mixing with video. When system graphics are enabled and an applet does not have focus, the system display buffer 220 output is selected for hardware mixing with video. And when system graphics are enabled and an applet has focus, software mixing is required.

When software mixing is required, region manager 290 determines whether the status of the system display or applet display has changed since the last time region manager 290 performed this analysis. In particular, if mixing was not performed on the immediately preceding frames, the anti-flicker display buffer 270 likely is not current and should be initialized before multiplexer 280 switches to accept output from buffer 270. In this instance, region manager 290 sets the whole display area as an update region before initiating mixing.

During software mixing, the output of buffers 210 and 220 is mixed to composite display buffer as shown in FIG. 6, and the anti-flicker display buffer is updated as shown in FIG. 7 from the composite display buffer on a frame interrupt to prevent frame tearing. Once the anti-flicker display buffer is stable, region manager 290 selects the anti-flicker display buffer for hardware mixing.

FIG. 6 shows the software mixing process. When no newly painted regions have been added to the paint region linked list since the last mixing operation, no software mixing is required and the routine returns. Otherwise, the first region in the paint region linked list is selected. Region manager 290 determines whether the paint region overlaps a system region in the system graphics section linked list: when the regions overlap, the output of buffers 210 and 220 are merged into composite display buffer 260, as previously described, for the paint region; when the paint region does not overlap any registered system region, the corresponding region of applet display buffer 210 is copied to composite display buffer 260.

Once the composite display buffer has been updated for a paint region, the corresponding node in the paint region linked list is modified to indicate a status of "mixed." Region manager 290 then traverses to the next node in the paint region linked list. When the next region is NULL, the end of the list has been reached and the software mixing routine exits. When the next paint region is not NULL and has not been mixed already, the software mixer loops back up and processes the new region as described for the first region.

FIG. 7 shows the anti-flicker display buffer update process. Preferably, an anti-flicker display buffer update routine is called on frame interrupt so that updates are synchronized with the display sequencing. Region manager 290 determines whether any paint regions in the paint region linked list have been marked as "mixed." When no newly mixed regions have been added to the paint region linked list since the last mixing operation, no anti-flicker display buffer updates are required and the routine returns. Otherwise, the first region in the paint region linked list is selected. Region manager 290 determines whether the first paint region has been mixed yet to the composite display buffer; when it has, the region is copied from the composite display buffer to the anti-flicker display buffer and the region is removed from the paint region linked list. When the first paint region has not yet been mixed, processing is bypassed for that region.

Region manager 290 then traverses to the next node in the paint region linked list. When the next region is NULL, the end of the list has been reached and the anti-flicker display buffer routine exits. When the next paint region is not NULL, the routine loops back up and processes the new region as described for the first region.

The Java engine allows multiple Java applets to run concurrently with each other and with the Java manager. As just described, however, only one applet at a time can have the "focus" of the viewer's remote control or other input device and perform updates to the applet display buffer. Platform-aware applets can be written to understand what it means to receive and lose focus, but no such assumption can be made when the viewer is allowed to load platform-independent Java applets from the PCMCIA port. Thus the television embodiments are designed to cope with two types of Java applets: platform-aware applets, which are coded specifically to interoperate with the Java manager and platform-specific APIs, and platform-independent applets, which are not. Generally, the applets that are factory-loaded into flash memory 126 are platform-aware applets, while applets accessible through PCMCIA cards can be either platform-aware applets or platform-independent applets. Platform-aware applets have access to platform-specific APIs to perform such functions as channel and volume changes, picture-in-picture functions, JPEG and MPEG4 display, etc.

The Java manager includes a class (the application manager) that functions as a Java applet browser/launcher. The application manager can be assigned to a specific key on the viewer's remote control and/or can be activated from a menu. The application manager maintains a list of currently-available Java applets that are available to the viewer. This list will typically include some of the Java applets stored in flash memory 126 (some may only be available to other Java applets and not to the viewer) and any applets found using PCMCIA cards 128. Preferably, the application manager locates descriptor files and icons for each available applet and can then present the applets to a viewer in an easily-comprehended graphical format. Note that if a PCMCIA card 128 provides wireless connectivity to multiple "shares," where a share is a shared resource located on a computer or other wireless device, applets available on each share can be arranged in the graphical format by share.

Assume for the following example that the application manager 310 is the described application manager and a platform-aware applet B 320 is an MP3 player. In addition, assume that the application manager has located two platform-independent applets, an applet C 330 and an applet D 340, which could be for instance a solitaire game and a checkers game, respectively. FIGS. 8A–8H illustrate applet/manager function as a viewer navigates between the application manager, these various applets, and the video function of the television. An applet that is currently not loaded to memory 122 is depicted with a dashed border; an applet that is loaded to memory 122 is depicted with a solid border; and an applet that has focus is depicted with a bold solid border.

Figure 8A:
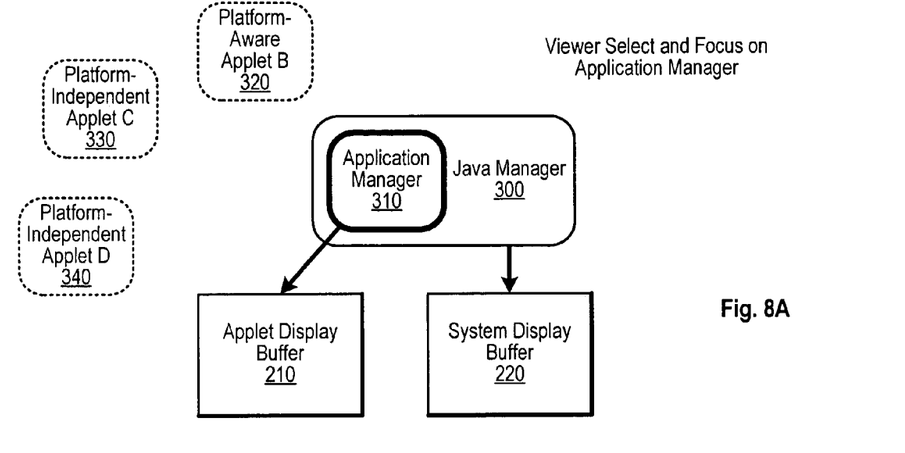
FIGS. 8A–H depict display paths for an application manager and three applets as the application/applet focus changes between various sources, according to some embodiments of the present invention.

In FIG. 8A, the viewer selects application manager 310 from a remote control. The Java manager 300 is notified of the viewer selection and directs focus to the application manager class. The Java engine is notified that the application manager class will now receive focus and receives a request to begin executing the class files for the application manager if they were not executing already. The application manager locates the applets available to the viewer in flash memory and through a PCMCIA card and creates a browse/launch display in applet display buffer 210. The viewer may then use remote control buttons to navigate and select one of the displayed applets, with the application manager modifying its display according to the navigation commands in order to interact with the viewer.

When a user selects one of the displayed applets, the application manager notifies Java manager 300 that the viewer has requested the launch of an applet. For instance, in FIG. 8B, the viewer selects applet B, the MP3 player. The Java manager 300 calls the Java engine to launch applet B. Application manager 310 loses focus and can no longer paint to the applet display buffer. The Java engine is notified that applet B will now receive focus and receives a request to begin executing the class files for the MP3 player. Applet B may provide to the viewer, for instance, playlists or individual MP3 file lists for MP3 files accessible through the PCMCIA cards 128. The viewer may then use remote control buttons to navigate and select an MP3 file, files, or playlist and hit "play" to begin playing the selected MP3 media through audio processor 124.

Although the application manager has now lost focus, it still runs in a background mode. When a new PCMCIA card is inserted or removed from the television, or new shares appear or disappear from the wireless LAN, the application manager can be programmed to notify the viewer that the list of available applets has changed. For instance, on PCMCIA card removal, all running processes receive a broadcast message that the card has been removed. Upon receiving this message, since the application manager does not have focus, it can signal another section of the Java manager to request a transient system message, e.g., "Some Applets No Longer Available—Press Applets Key to View Current List". Java manager 300 requests a system graphics section for the message and displays it to system display buffer 220.

Figure 8B:
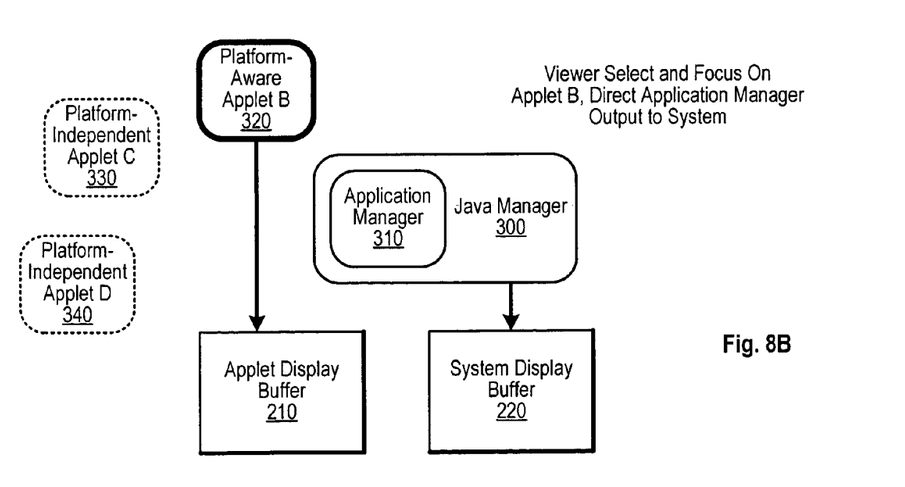
Figure 8C:
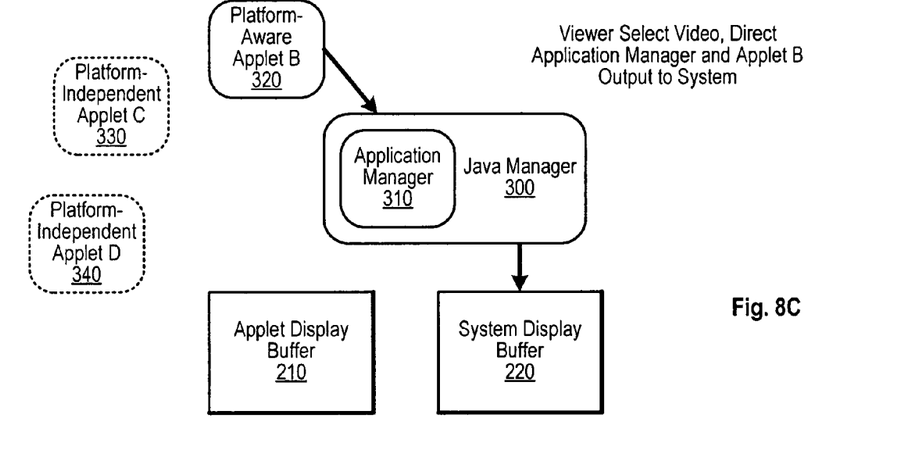

Referring now to FIG. 8C, the viewer now selects a Video mode, causing applet B to lose focus. Java manager 300 asks applet B whether it can be killed. In this example, applet B responds "no," at which time applet B is notified that it has lost focus and can no longer paint to the applet display buffer. The Java engine is notified that applet B has lost focus, but applet B can continue to play MP3 files in a background mode. Like the application manager, applet B can use the Java manager to display status messages, such as a song name when a new song starts, on the system display buffer.

Figure 8D:
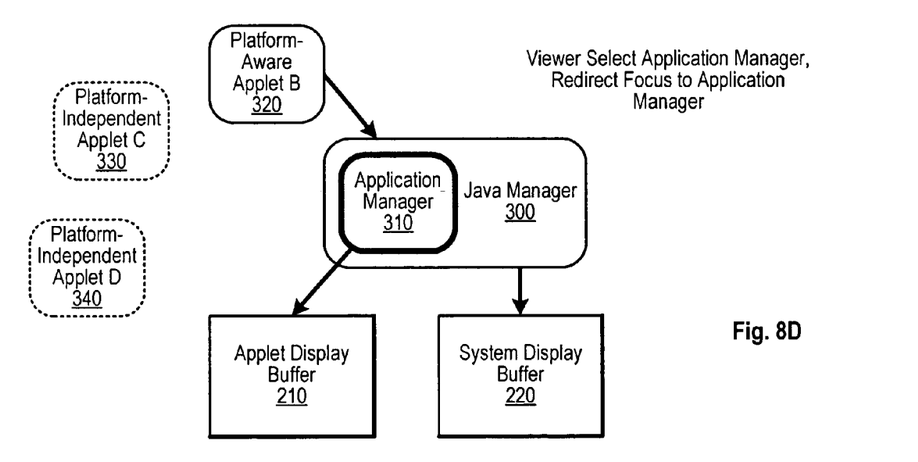

In FIG. 8D, the viewer presses a button to return focus to the application manager. The Java engine is notified that the application manager now has focus, the application manager is notified that it has focus, and the application manager once again draws its applet browser display to applet display buffer 210.

Figure 8E:
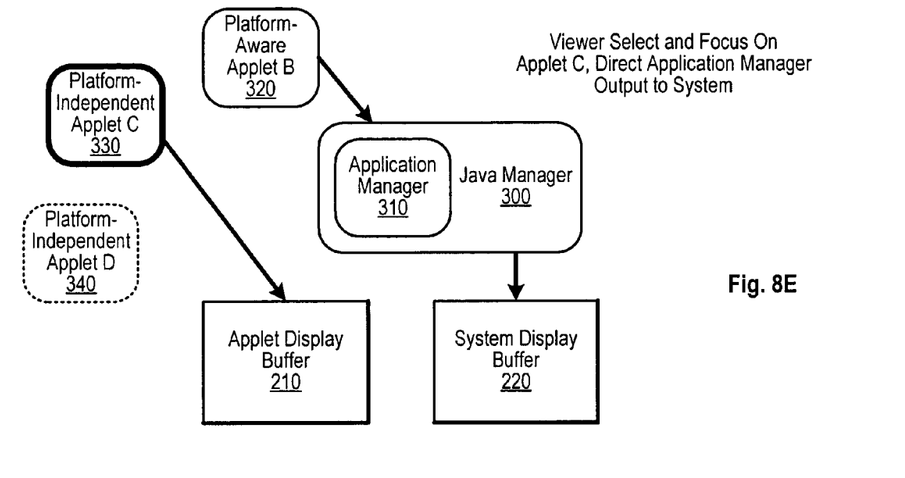
Figure 8F:
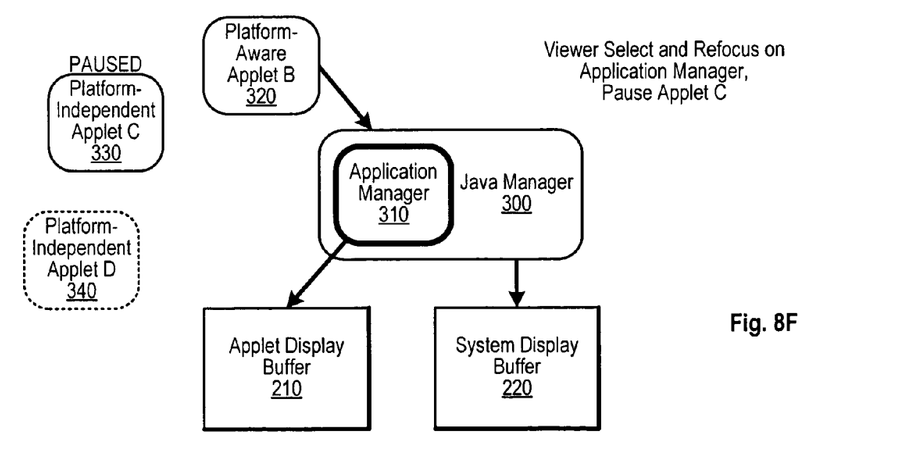

In FIG. 8E, the viewer selects a platform-independent applet C (the solitaire game) and launches it, causing a series of events similar to those described for FIG. 8B. The solitaire game class files are loaded from the PCMCIA card to memory 122 and applet C is launched. Whereas applet B registered as a platform-aware applet when launched, applet C has no such registration function, and thus the Java manager 300 and Java engine know that applet C has no internal provision for receiving and losing focus. Applet C output is directed to the applet display buffer and the viewer can operate the applet using remote control buttons. Since the applet display buffer requires no special API controls, platform-independent applets can write to it without problem. The Java engine and software mixer allow the platform-independent applets to function in a manner that is compatible with the television platform.

In FIG. 8F, the viewer once again selects the application manager to regain focus. Applet C cannot continue to run because it does not have the ability to direct its output anywhere but the applet display buffer, and thus would interfere with the output of the application manager. Applet C can either be killed or "paused," i.e. remain in memory but not receive any calls, as a design choice. If paused, applet C can potentially be resumed by reselecting it from the application manager. The kill or pause decision can also be based on other criteria, such as memory usage. Thus if memory usage is high, the oldest "paused" applets can be deleted from memory.

Figure 8G:
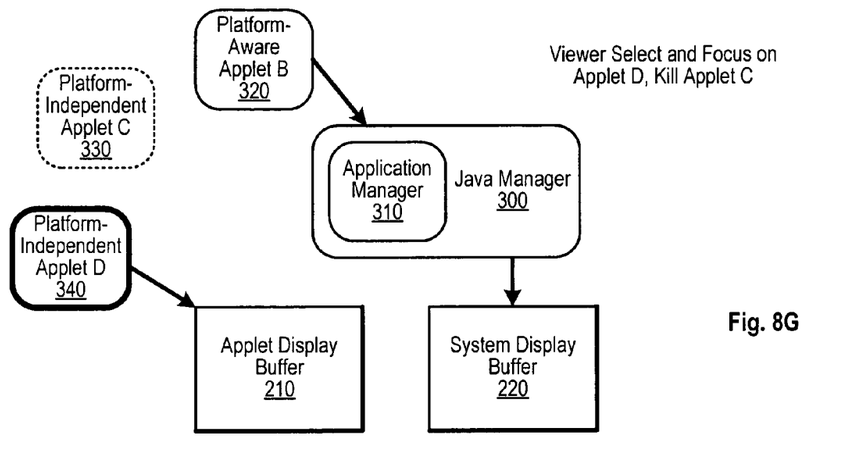
Figure 8H:
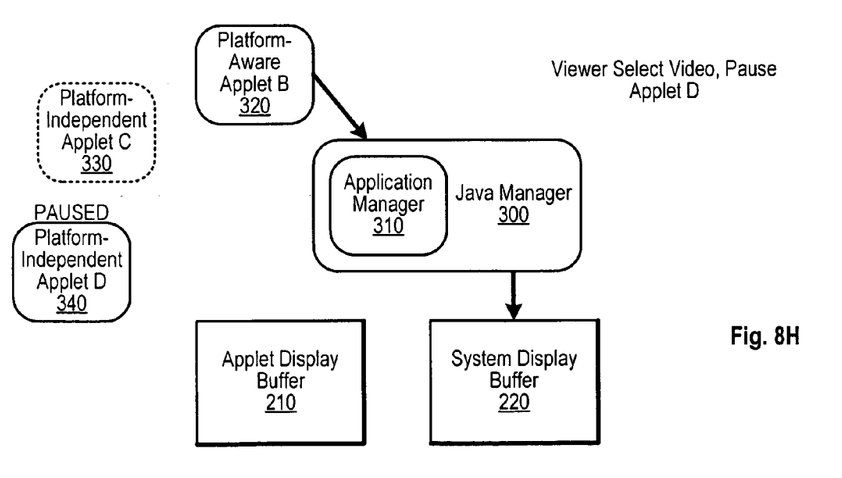

FIG. 8G illustrates a case where the viewer selects a different platform-independent applet D to run. Before applet D class files are loaded, applet C can be killed to free memory, and then applet D can be launched and run in similar fashion to applet C.

Finally, in FIG. 8H the viewer once again selects a Video mode, causing the Java manager to pause (or optionally kill) applet D.

Although optional, the application manager could allow other applet-related activities. For instance, applets could be copied from a network share to PCMCIA mass memory. Or, a "favorite applet" could be designated and saved to flash memory 126.

One of ordinary skill in the art will recognize that the concepts taught herein can be tailored to a particular application in many other advantageous ways. In particular, those skilled in the art will recognize that the illustrated embodiments are selected from many alternative implementations that will become apparent upon reading this disclosure. The particular functional block groupings used herein present one possible functional grouping, but functions can be subdivided and/or combined in many other combinations that fall within the scope of the appended claims. Although Java applets have been described, the described embodiments can be used with other object-oriented coding schemes.

The removable device port can be a port other than a PCMCIA port. For instance, a Firewire (IEEE 1394) or USB (Universal Serial Bus) 2.0 port can be used to connect a removable device. Ports that directly accept Memory Stick, MultiMedia Card, Secure Digital, SmartMedia, and/or XD flash devices can also be used.

Two Java buffers have been described, but more can exist and be integrated into the described mixing schemes. Mixing with a single hard key has been described, but more complicated mixing schemes are possible. Such minor modifications are encompassed within the embodiments of the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A television comprising:
    at least one video input;
    a programmable processor to supply a digital video stream for a television display, the digital video stream based on the video input in at least one operational mode;
    a removable-device port coupled to the programmable processor; and
    an execution engine capable of launching applets accessible through the removable-device port when a removable device is inserted in the removable-device port;
    wherein the programmable processor is capable of directing the output of an applet accessed through the removable-device port to the digital video stream.

2. The television of claim 1, further comprising a digital video input to the programmable processor, the processor having the capability to merge output from an applet with digital video received at the digital video input to create the digital video stream.

3. The television of claim 1, wherein the execution engine runs a manager application that can run concurrently with an applet, the manager application directing graphical output to a system display plane and the applet directing graphical output to an applet display plane.

4. The television of claim 3, wherein the programmable processor merges the system display plane and the applet display plane to create the digital video stream.

5. The television of claim 3, wherein an applet accessed through the removable-device port is a platform-independent applet, the television further comprising a platform-aware applet capable of concurrent execution with the platform-independent applet.

6. The television of claim 5, wherein the platform-aware applet is capable of directing graphical output at either the system display plane or the applet display plane, as instructed by the manager application.

7. The television of claim 1, further comprising a non-volatile memory coupled to the programmable processor, wherein the programmable processor is capable of transferring an applet from the removable-device port to the non-volatile memory.

8. The television of claim 1, further comprising a memory coupled to the programmable processor, wherein the programmable processor loads applet code from the removable-device port to the memory, and executes the applet from the memory.

9. The television of claim 8, further comprising a just-in-time compiler to compile the applet code prior to execution.

10. The television of claim 1, wherein the removable-device port contains one or more ports selected from the group of port types consisting of a Personal Computer Memory Card International Association (PCMCIA) PC card port, a Universal Serial Bus port, a Firewire port, a flash memory device port, and combinations thereof.

11. The television of claim 1, further comprising the removable device, wherein the removable device provides access to applets located on a memory device integral to the removable device.

12. The television of claim 1, further comprising the removable device, wherein the removable device provides access to applets via a wireless connection to a remote device storing the platform-independent applets.

13. The television of claim 1, wherein the execution engine is a Java engine and the applets are Java applets.

14. The television of claim 1, wherein the execution engine is capable of launching both platform-aware and platform-independent applets accessible through the removable-device port when a removable device is inserted in the removable-device port.

15. A method of operating a television, the method comprising:
providing a television port that allows a viewer to connect a removable device to the television;
accessing a removable device connected to the television port to obtain an applet;
running the applet; and
directing the output of the applet to a television display.

16. The method of claim 15, further comprising running a manager application that controls loading and execution of the applet.

17. The method of claim 16, wherein the manager application is capable of loading and executing both platform-aware and platform-independent applets.

18. The method of claim 17, further comprising the applet identifying itself as a platform-aware applet when the applet is a platform-aware applet.

19. The method of claim 18, wherein the manager application is capable of concurrent execution of first and second applets when at least the first applet is a platform-aware applet, the method further comprising:
directing the output of the first applet to a system display plane;
directing the output of the second applet to an applet display plane; and
merging the output of the system and applet display planes to form the output directed to the television display.

20. The method of claim 19, further comprising:
instructing the first applet as to whether it is directing its output to the system display plane or the applet display plane; and
the first applet modifying its output according to the plane that is currently receiving the first applet's output.

21. The method of claim 15, further comprising copying the applet from the removable device to a system memory device and executing the applet from the system memory device.

22. The method of claim 21, further comprising compiling the applet to the system memory device.

23. A method of operating a television, the method comprising:
running first and second applets concurrently;
directing the output of the first applet to a system display plane;
directing the output of the second applet to an applet display plane; and
merging the output of the system and applet display planes to form an output directed to a television display.

24. The method of claim 23, further comprising the first applet modifying its output depending on whether that output is directed to the system display plane or the applet display plane.

* * * * *